United States Patent [19]

Kumura

[11] Patent Number: 4,836,054

[45] Date of Patent: Jun. 6, 1989

[54] REDUCTION RATIO CONTROL FOR CONTINUOUSLY VARIABLE TRANSMISSION

[75] Inventor: Haruyoshi Kumura, Kamakura, Japan

[73] Assignee: Nissan Motor Co., Ltd., Yokohama, Japan

[21] Appl. No.: 934,106

[22] Filed: Nov. 24, 1986

[30] Foreign Application Priority Data

Nov. 25, 1985 [JP] Japan .................. 60-262650

[51] Int. Cl.$^4$ .......................................... B60K 41/12
[52] U.S. Cl. ........................................ 74/866; 74/867
[58] Field of Search ............... 74/865, 866, 867, 877; 364/424.1

[56] References Cited

U.S. PATENT DOCUMENTS

| | | | |
|---|---|---|---|
| 4,458,318 | 7/1984 | Smit et al. | 364/424.1 |
| 4,533,340 | 8/1986 | Abo et al. | 474/28 |
| 4,543,077 | 9/1985 | Yamamuro et al. | 474/12 |
| 4,559,029 | 12/1985 | Miranti, Jr. et al. | 474/251 |
| 4,579,021 | 4/1986 | Yamamuro et al. | 74/869 |
| 4,589,071 | 5/1986 | Yamamuro et al. | 364/424.1 |
| 4,590,561 | 5/1986 | Abo et al. | 74/866 X |
| 4,603,602 | 8/1986 | Tanaka et al. | 74/866 |
| 4,637,277 | 1/1987 | Gaddi | 74/865 |
| 4,653,005 | 3/1987 | Osanai et al. | 74/866 X |
| 4,660,440 | 4/1987 | Matsumura et al. | 74/866 |
| 4,665,775 | 5/1987 | Nagamatsu et al. | 74/868 |
| 4,669,336 | 6/1987 | Okada et al. | 74/867 |
| 4,670,843 | 6/1987 | Matsumura et al. | 364/424.1 |
| 4,702,123 | 10/1987 | Hirao et al. | 74/526 |

FOREIGN PATENT DOCUMENTS

| | | |
|---|---|---|
| 0092227 | 10/1983 | European Pat. Off. |
| 0093413 | 11/1983 | European Pat. Off. |
| 0111891 | 6/1984 | European Pat. Off. |
| 57-161346 | 10/1982 | Japan |
| 58-170958 | 7/1983 | Japan |
| 58-170959 | 7/1983 | Japan |

OTHER PUBLICATIONS

Dubbel, "Taschenbuch fur den Maschinenbau", corrected reprint of the 13th edition, second volume, Springer Verlag Berlin New York, 1974, p. 883, German Language book.

Stueper, "Automatische Automobilgetriebe", Springer-Verlag Wien-New York, 1965, pp. 301-309, Austrian book.

Primary Examiner—Dwight G. Diehl
Attorney, Agent, or Firm—Foley & Lardner, Schwartz, Jeffery, Schwaab, Mack, Blumenthal & Evans

[57] ABSTRACT

A reduction ratio control for a continuously variable transmission is provided. In this control, a target value is changed to a new target value in response to deceleration after the motor vehicle has started decelerating, and the reduction ratio change is carried out in such a manner as to decrease a difference between an actual value and the new target value toward zero.

9 Claims, 8 Drawing Sheets

REDUCTION RATIO CONTROL FOR CONTINUOUSLY VARIABLE TRANSMISSION

BACKGROUND OF THE INVENTION

The present invention relates to a reduction ratio control for a continuously variable transmission for a motor vehicle, and more particularly to a reduction ratio control after the motor vehicle has started deceleration.

Laying-open Japanese Patent Application 58-170958 discloses a reduction ratio control for a continuously variable transmission. In this known reduction ratio control, the discharge of hydraulic fluid from the driver pulley starts upon receiving a brake operation signal generated after depression of a brake pedal, causing the transmission to shift down toward the largest reduction ratio. Laying-open Japanese Patent Application 58-170959 discloses another reduction ratio control wherein the transmission starts shifting down toward the largest reduction ratio immediately after the throttle valve has been fully closed.

Since, according to these known reduction ratio controls, the transmission starts shifting down upon receiving a change in operating condition which change is empirically considered to take place before the driver demands engine brake running, there is an advantage that, even with the continuously variable transmission that is poor in ratio change response, the engine brake running is effected quickly as desired.

However, the speed at which the continuously variable transmission shifts down is not quick enough so that the transmission cannot establish the largest reduction ratio before the vehicle comes to a halt if the vehicle is subject to quick brake operation to such an extent that the road wheels are locked, causing the transmission output shaft to stop its rotation. If the road wheels are locked during brake operation, the vehicle speed indicated by the vehicle speed indicative signal becomes zero. This urges the transmission to effect shifting down further toward the largest reduction ratio, but since, when the transmission output shaft and in turn the driven pulley is not in rotation, the ratio change response is very poor. If the accelerator pedal is depressed immediately after this shifting down operation has started by discharging hydraulic fluid from the driver pulley, the transmission V-belt slips, failing to transmit torque, causing the V-belt to wear at a quick rate. This is because the friction between the V-belt and the driver pulley is lost when hydraulic fluid is being discharged from the driver pulley for effective shifting down operation.

In addition to the above problem, there is another problem that since the shifting down operation takes place immediately after a change in operating condition in anticipation of need for engine brake running, the transmission may shift down even if the driver steps on the brake pedal without any intention of engine brake running. In this case, the vehicle's performance fails to correspond to the driver's feeling.

An object of the present invention is to provide a reduction ratio control for a continuously variable transmission which ensures that the transmission establishes the largest reduction ratio before the vehicle comes to a halt, preventing the V-belt from slipping upon application of torque to the transmission even after the vehicle has been subject to quick brake operation.

SUMMARY OF THE INVENTION

According to the present invention, there is provided a reduction ratio control of a continuously variable transmission. This control comprises: means for carrying out a reduction ratio change of the continuously variable transmission in such a manner as to decrease a difference between an actual value in a predetermined operating variable and a target value in said predetermined operating variable toward zero; means for determining a deceleration of the motor vehicle; means for changing said target value to a new target value in response to said deceleration after the motor vehicle has started decelerating in such a direction as to cause said reduction ratio change carrying out means to decrease a difference between said actual value and said new target value.

Another aspect of the present invention resides in a method of controlling a reduction ratio of a continuously variable transmission. The method comprising the steps of: carrying out a reduction ratio change of the continuously variable transmission in such a manner as to decrease a difference between an actual value in a predetermined operating variable and a target value in said predetermined operating variable toward zero; determining a deceleration of the motor vehicle; changing said target value to a new target value in response to said deceleration after the motor vehicle has started decelerating in such a direction as to decrease a difference between said actual value and said new target value.

DETAILED DESCRIPTION OF THE INVENTION

Referring to FIGS. 1 through 7, a first embodiment according to the present invention is described.

Figure 1:
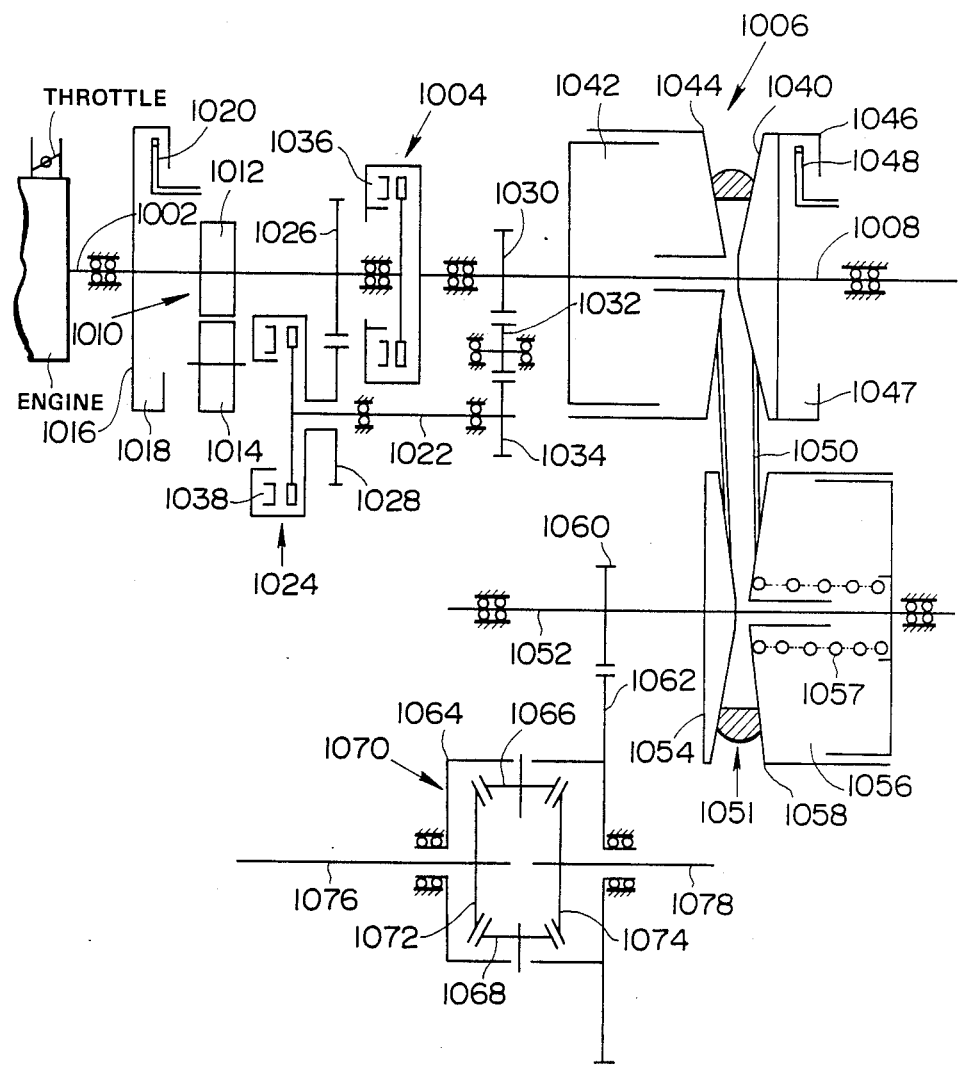
FIG. 1 is a diagrammatic view of a vehicle's power train including a continuously variable V-belt transmission.

FIG. 1 shows a power transmission mechanism of a continuously variable V-belt transmission of an automotive vehicle.

Figure 2A:
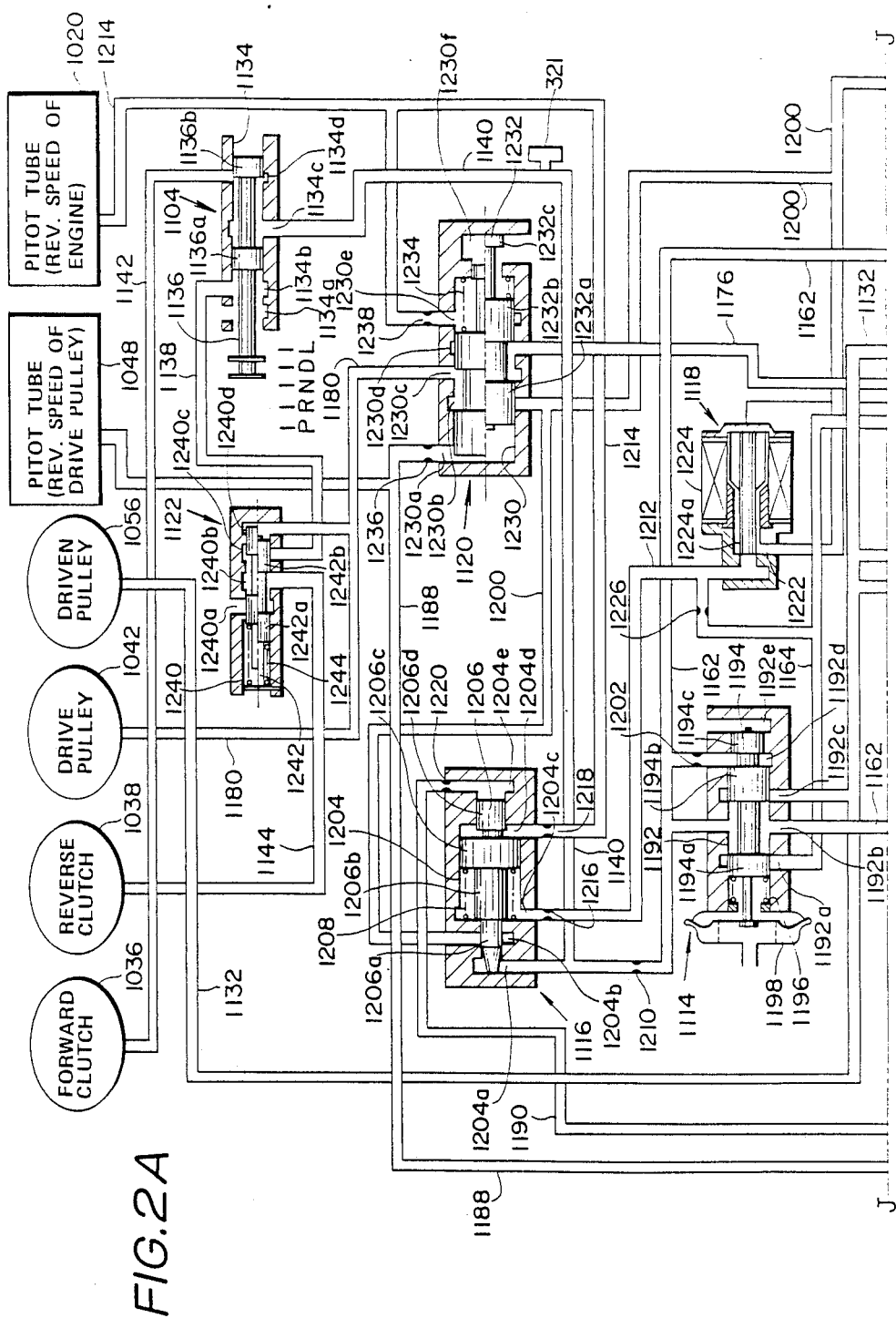
FIGS. 2A and 2B, when combined, illustrate a hydraulic control system for the continuously variable V-belt transmission.
Figure 2B:
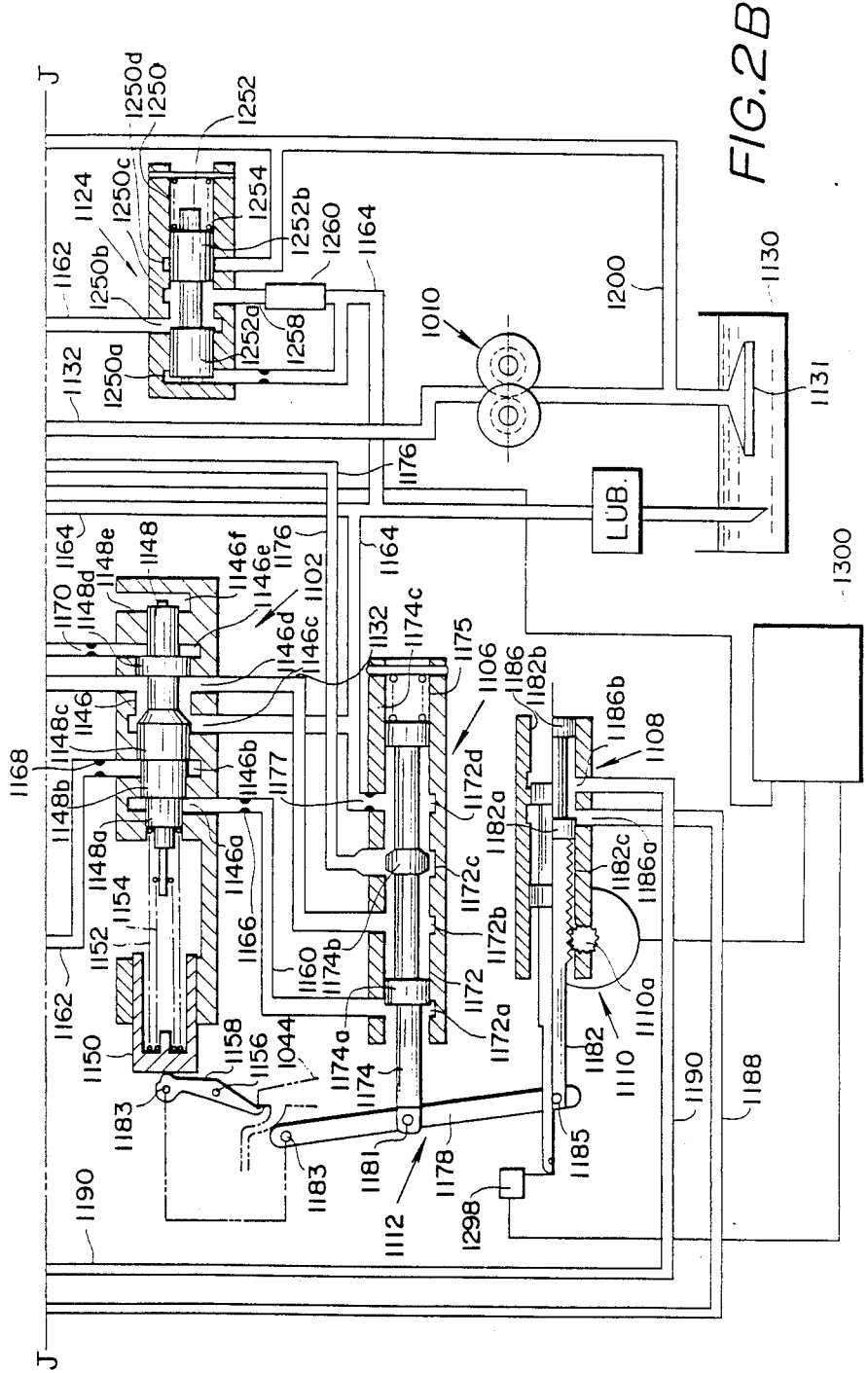

FIGS. 2A and 2B show a hydraulic control system for the continuously variable V-belt transmission.

The detailed description of FIG. 1 and FIGS. 2A, 2B is found in U.S. Pat. No. 4,579,021 issued Apr. 1, 1986 or the corresponding European Patent application publication number 0093413 published on Nov. 9, 1983 (see particularly FIGS. 24 and 25A, 25B).

That portion of the disclosure of this U.S. Patent or published European Patent application which relates to FIGS. 24, 25A and 25B is hereby incorporated by reference in its entirety.

Referring to FIG. 1, an input shaft 1002 coupled with an engine crankshaft of an engine is connectable via a forward clutch 1004 with a driver shaft 1008 having thereon a driver pulley 1006. Mounted on the input shaft 1002 is an oil pump 1010 having a driving gear 1012 and a driven gear 1014. Secured unitary to the input shaft 1002 is a rotary endless flume 1016, which flume 1016 is formed by curling inwardly the outer periphery of a generally disc-like plate to form an oil reservoir 1018. The flume 1016 is provided with a pipe (not shown) through which a predetermined amount of oil is supplied to the oil reservoir 1018.

Provided in the oil reservoir of the flume 1016 is a pitot tube 1020. An auxiliary shaft 1022 is rotatably arranged in parallel to the input shaft 1002 and has mounted on one end thereof a reverse clutch 1024. The input shaft 1002 and auxiliary shaft 1022 have thereon gears 1026 and 1028, respectively, which are meshed with each other. The auxiliary shaft 1022 has on the other end thereof an integral gear 1034 which is in mesh with an idler gear 1032. The idler gear 1032 is in mesh with a gear 1030 rotatable with the driver shaft 1008. The forward clutch 1004 and reverse clutch 1024 are engage when oil pressure builds up in piston chambers 1036 and 1038 thereof, respectively. Engagement of the forward clutch 1004 causes engine rotation to be transmitted to the driver shaft 1008, while engagement of the reverse clutch 1024 causes engine rotation to be transmitted to the driver shaft 1008 through gears 1026, 1028, 1034, 1032 and 1030 where the direction of rotation is reversed.

The driver pulley 1006 comprises a fixed conical disc 1040 rotatable with the driver shaft 1008, and a movable conical disc 1044 which faces the fixed conical disc 1040 to form a V-shaped pulley groove therebetween. The movable conical disc 1044 is axially movable in response to the level of oil pressure applied to its cylinder chamber 1042. The fixed conical disc 1040 of the driver pulley 1006 is provided with a rotary endless flume 1046 which is similar to the before mentioned flume 1016. The dynamic pressure of the oil within an oil reservoir 1047 of the flume 1046 is measured by a pitot tube 1048. The driver pulley 1006 is connected with the driven pulley 1051 by a V-belt tensioned therearound. The driven pulley 1051 is mounted on a rotatable driven shaft 1005. The driven pulley 1051 comprises a fixed conical disc 1054 with the driven shaft 1052, and a movable conical disc 1058 which faces the fixed conical disc 1054 to form a V-shaped pulley groove and is axially movable due to the oil pressure applied to its cylinder chamber 1056 and a spring 1057 therein. Rotation of the driven shaft 1052 is transmitted through a gear 1060 to a ring gear 1062 of a differential case which receives therein a differential 1070 composed of a pair of pinion gears 1066 and 1068 and a pair of side gears 1072 and 1074 meshing with the corresponding pinion gears 1066 and 1068. Output shafts 1076 and 1078 are coupled with the side gears 1072 and 1074, respectively.

Referring to FIGS. 2A and 2B, a hydraulic control system for the continuously variable transmission is hereinafter described. As shown in FIGS. 2A and 2B, the control system comprises an oil pump 1010, a line pressure regulator valve 1102, a manual valve 1104, a shift control valve 1106, a clutch complete engagement control valve 1108, a shift motor in the form of a stepper motor 1110, a shift operating mechanism 1112, a throttle valve 1114, a starting valve 1116, a start adjustment valve 1118, a maximum reduction ratio maintaining valve 1120, a reverse inhibitor valve 1122, a lubrication valve 1124, a force motor 1224, and an electronic control unit 1300.

Figure 3:
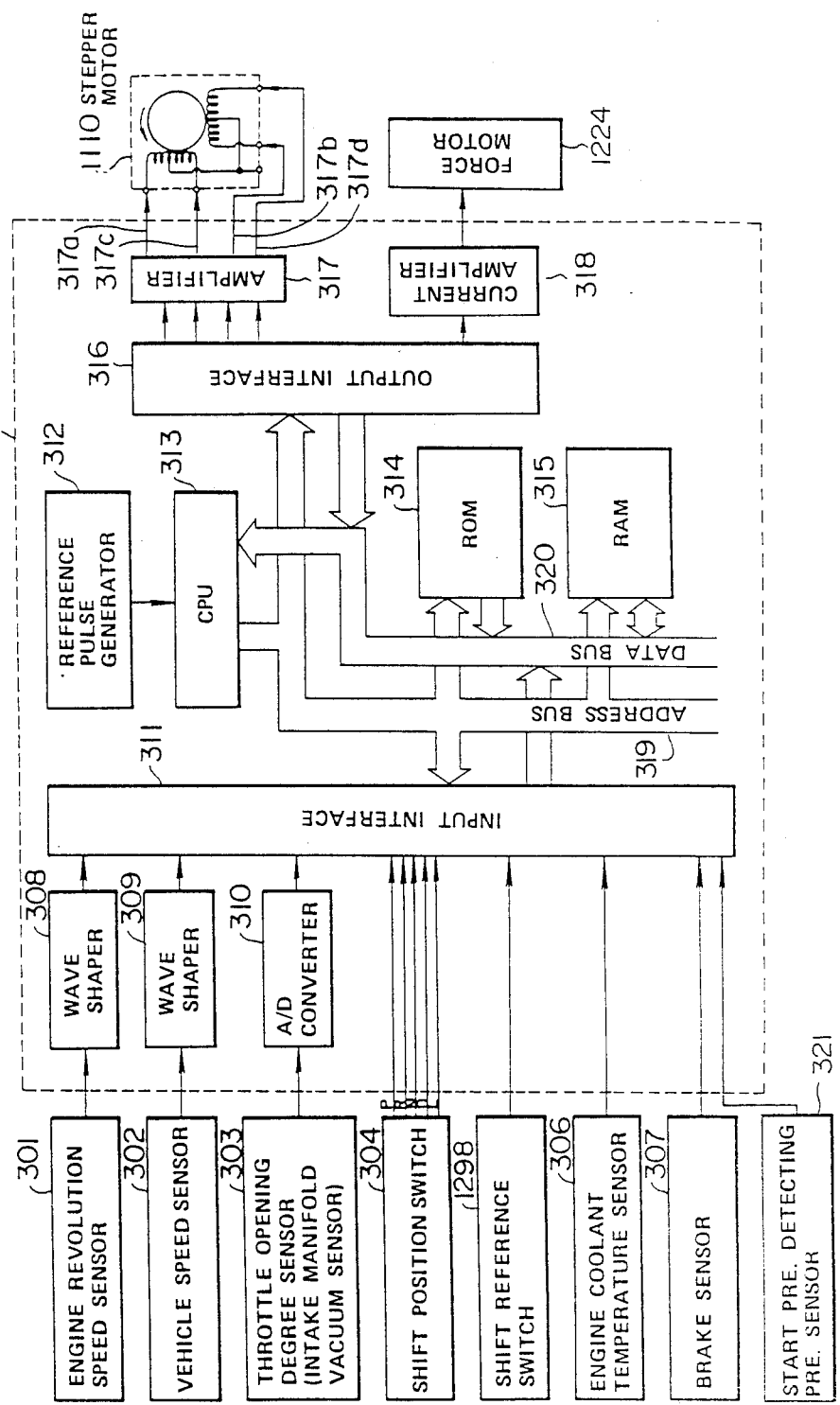
FIG. 3 is a block diagram showing an electronic control unit 1300 for controlling a shift actuator in the form of a stepper motor 1110 and a force motor 1224 shown in FIGS. 2A and 2B.

The control unit 1300 is described in FIG. 3 of U.S. Pat. No. 4,603,602 issued Aug. 5, 1986 or the corresponding European Patent application publication number 0111891 published on Aug. 21, 1985 which is hereby incorporated by reference in its entirety.

As shown in FIG. 3, various input signals are supplied to the control unit 1300. They comprise electric signals generated by an engine revolution speed sensor 301, a vehicle speed sensor 302, a throttle opening degree sensor (or an intake manifold vacuum sensor) 303, a shift position switch 304, a shift reference switch 1298, an engine coolant temperature sensor 306, a brake sensor 307, and a start pressure detecting sensor 321. The signals generated by the engine revolution speed sensor 301 and vehicle speed sensor 302 are sent to an input interface 311 after passage through wave shapers 308 and 309, respectively, and the electric voltage from the throttle opening degree sensor (or intake manifold vacuum sensor) 303 is converted at an A/D converter 310 into a digital signal before being sent to the input interface 311. The control unit 1300 also includes a reference pulse generator 312, a CPU (Central Processor Unit) 313, a ROM (Read Only Memory) 314, a RAM (Randam Access Memory) 315, and an output interface 316, which are linked with each other by an address bus 319 and a data bus 320. Output signals from the control unit 1300 are sent out to the stepper motor 1110 and force motor 1224 via an amplifier 317 and an electric current amplifier 318, respectively.

Figure 4:
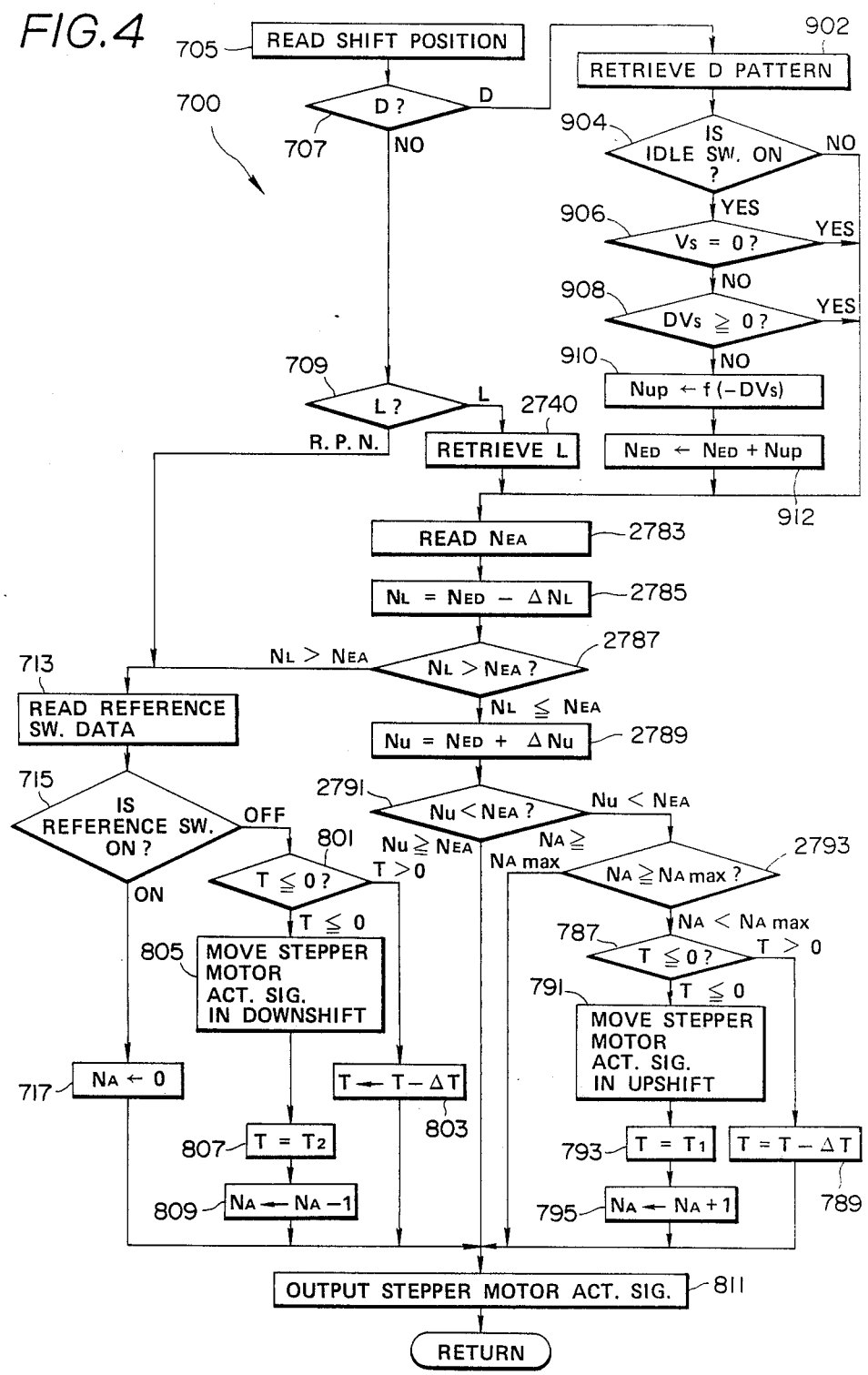
FIG. 4 is a flow chart of a control routine executed by a reduction ratio control according to the present invention.
Figure 5:
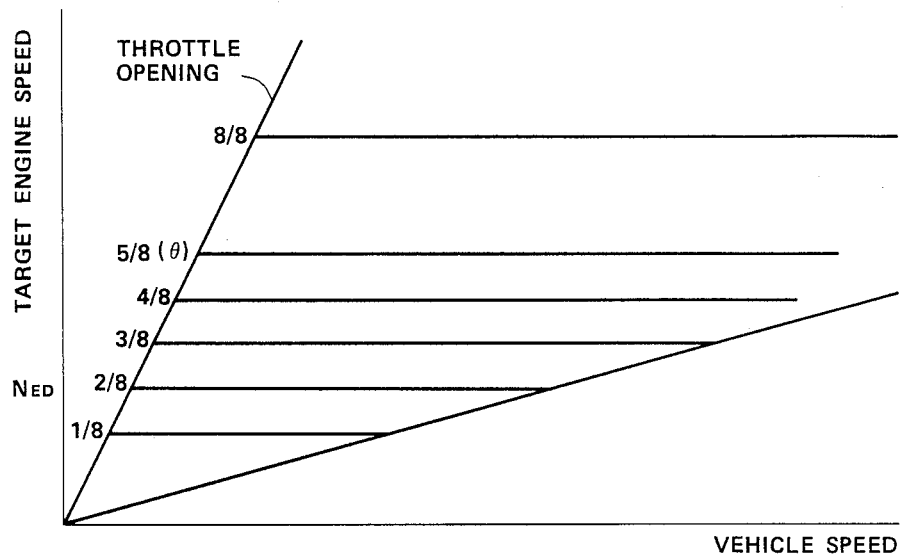
FIG. 5 is a graphical representation of retrievable data table of target values in engine speed versus vehicle speed and throttle opening, this data table being designed to provide an optimum shift pattern in which the reduction ratio varies for D range operation.
Figure 6:
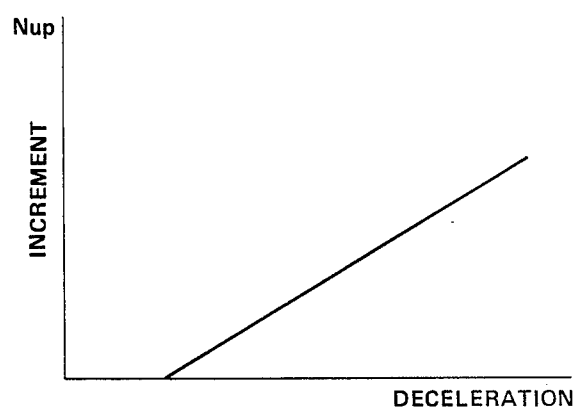
FIG. 6 is a graph showing an increment Nup versus deceleration.

The stepper motor 1110 and force motor 1224 are controlled by the control unit 1300. The content of control carried out by the control unit 1300 in controlling the stepper motor 1110 and force motor 1224 may be divided into a force motor control routine, a complete engagement control routine, and a stepper motor control routine 700 which will be described later. Regarding the force motor control routine and the complete engagement control routine, reference is made to U.S. Pat. No. 4,603,602 issued Aug. 5, 1986 or the corresponding European Patent application publication No. 0111891 published on Aug. 21, 1985 which is hereby incorporated by reference in its entirety. Briefly, the force motor control routine is shown in FIG. 4 of U.S. Pat. No. 4,603,602 or EP 0111891. With this force motor control routine, the level of start pressure Ps is controlled via the start adjustment valve 1118 and starting valve 1116 when the vehicle is substantially at a standstill with the engine idling in order to hold the forward clutch 1004 (or the reverse clutch 1024) at a predetermined state immediately before the clutch starts engaging. The complete engagement control routine is shown in FIGS. 5(a), 5(b) and 6 of U.S. Pat. No. 4,603,602 or EP 0111891. With the complete engagement control routine, the engagement of the clutch 1004 or 1024 is controlled.

The above mentioned U.S. Pat. No. 4,603,602 or EP 0111891 shows in FIGS. 22(a) and 22(b) a stepper motor control routine which is similar to a stepper motor control routine 700 which is hereinafter described referring to FIG. 4.

FIG. 4 shows a flow chart of the stepper motor control routine 700. In step 705, data from the shift position switch 304 which relate to a shift position currently set by the manual valve 1104 is stored. Step 707 determines whether the stored data in step 705 indicates that the manual valve 1104 is set at D range position. If an answer to the inquiry in step 707 is YES, i.e., if the manual valve 1104 is set at D range position, step 902 retrieves a D range shift pattern table stored using throttle opening degree TH and vehicle speed V which have been already stored during the force motor control routine and determines a target engine speed to be stored at an address name $N_{ED}$. The D range shift pattern is illustrated in FIG. 5. Target engine speed values are arranged versus various vehicle speed values and throttle opening degree values as shown in FIG. 5 and stored in the ROM 314 at appropriate addresses. Step 904 is executed to determine whether the engine is operating with the throttle valve fully closed. Thus, step 904 may comprise comparison of stored throttle opening degree TH with a predetermined very small value near zero or determine whether an idle switch is ON if the idle switch is provided. If the engine is operating with the throttle valve substantially fully closed, step 906 is executed to determine whether vehicle speed Vs is equal to zero. If vehicle speed Vs is not equal to zero as a result of an inquiry in step 906, an acceleration DVs is determined. The acceleration DVs may be given by subtracting the present data of Vs from the old data of Vs stored during the preceding run of the control routine. The manner of determining the actual acceleration is well known from U.S. Pat. No. 4,589,071 issued on May 13, 1986 or the corresponding European Patent application publication No. 0092227 published on Oct. 26, 1983 (see particularly FIG. 9(c) for determining an acceleration Av). The detailed description of determining the acceleration DVs is thus omitted.

In step 908, acceleration DVs is compared with zero to determine whether DVs is greater than or equal to zero. If an answer to the inquiry in step 908 is NO, i.e., the acceleration DVs is less than zero and negative, step 910 is executed which comprises a table look-up of FIG. 6 in order to determine an increment Nup. As shown in FIG. 6, the increment Nup is variable in proportion to the magnitude of deceleration $-DVs$. The value of increment Nup represents a desired change in target engine speed for a given magnitude of deceleration. Then, step 912 is executed which comprises increasing the target engine speed $N_{ED}$ obtained in retrieving step 902 by the increment Nup obtained in step 910. Then, the control routine goes to step 2783. If the inquiry in step 904 is NO or the inquiry in step 906 is YES or the inquiry in step 908 is YES, the control goes to step 2783 bypassing two steps 910 and 912. In this case, the value of $N_{ED}$ obtained in step 902 remains unchanged.

In step 2783, data from the engine speed sensor 301 is stored as an actual engine speed $N_{EA}$. Then, step 2785 is executed which comprises subtraction of a predetermined small value $\Delta N_L$ from the stored target engine speed $N_{ED}$ to give a target engine speed lower limit $N_L$. Then, step 2787 is executed which comprises comparison of the target engine speed lower limit $N_L$ with the actual engine speed $N_{EA}$ to determine whether $N_{EA}$ is less than $N_L$. If $N_{EA}$ is less than $N_L$, the control goes to step 713. If $N_{EA}$ is not less than $N_L$, the control goes to step 2789. In step 713, data from the shift reference switch 1298 is stored. In step 715, the stored data from the shift reference switch 1298 is judged to determined whether the shift reference switch 1298 is turned ON. If an answer to the inquiry in step 715 is YES, i.e., if the shift reference switch 1298 is turned ON, a stepper motor pulse number $N_A$ is set equal to zero or reset and then the same stepper motor actuating signals as those obtained in the previous run are output in step 811. The shift reference switch 1298 is designed to be turned ON when a rod 1182 of the shift operating mechanism 1112 assumes a predetermined position which is to be assumed always whenever the largest reduction ratio is established. If the answer to the inquiry in step 715 is NO, i.e., if the shift reference switch 1298 is turned OFF, step 801 is executed which determines whether a timer value T stored is less than or equal to zero. If the stored timer value T is greater than zero, the timer valve T is decreased by a predetermined small value $\Delta T$ in step 803, and the same stepper motor actuating signals as those obtained in the previous run are output in step 811. Since the timer value T is decreased in step 803, the time value T drops to or below zero after repeating this flow including this step 803. When the timer value T becomes equal to zero or below zero, the answer to the inquiry in step 801 beccomes YES and step 805 is executed where the stepper motor actuating signals are moved by one step in downshift direction. Then, in step 807, the timer value T is set equal to a predetermined positive value $T_2$ and in step 809, the stepper motor pulse number $N_A$ is decreased by one. The stepper motor actuating signals are described referring particularly to FIGS. 13 and 14 in U.S. Pat. No. 4,603,602 or EP 0111891. Therefore, the stepper motor 1110 is activated in the downshift direction by one unit upon elapse of the period of time $T_2$.

If the answer to the inquiry in step 2787 is NO, i.e., if $N_{EA}$ is greater than or equal to $N_L$, step 2789 is executed where the desired engine speed $N_{ED}$ is increased by a small engine speed value $\Delta Nu$ to give a target engine speed upper limit value Nu. Then, in step 2791, the target engine speed upper limit value Nu is compared with the actual engine speed $N_{EA}$ to determine whether the actual engine speed $N_{EA}$ is greater than the target engine speed upper limit value Nu. If an answer to the inquiry in step 2791 is NO., i.e., if $N_{EA}$ is less than or equal to Nu, the same stepper motor actuating signals as those obtained in the previous run are output in step 811. If the answer to the inquiry in step 2791 is YES, i.e., if $N_{EA}$ is greater than Nu, step 2793 is executed which compares the stepper motor pulse number $N_A$ with the maximum pulse number $N_{Amax}$ to determine whether $N_A$ is greater than or equal to $N_{Amax}$. If an answer to the inquiry in step 2793 is YES, i.e., if $N_A$ is greater than or equal to $N_{Amax}$, the same stepper motor actuating signals as those obtained in the previous run is output in step 811. If the answer to the inquiry in step 2793 is NO, i.e., if $N_A$ is less than $N_{Amax}$, step 787 is executed which compares the timer value T stored with zero to determine whether T is less than or equal to zero. If the stored timer value T is greater than zero, the timer valve T is decreased by the predetermined small value ΔT in step 789, and the same stepper motor actuating signals as those obtained in the previous run are output in step 811. Since the timer value T is decreased in step 789, the timer value T drops to or below zero after repeating this flow including this step 789. When the timer value T becomes equal to zero or below zero, the answer to the inquiry in step 787 becomes YES and step 791 is executed where the stepper motor actuating signals are moved by one step in upshift direction. Then, in step 793, the timer value T is set equal to a predetermined positive value $T_1$ and in step 795, the stepper motor pulse number $N_A$ is increased by one. Therefore, the stepper motor 1110 is activated in the upshift direction by one unit upon elapse of the period of time $T_1$. The period of time $T_1$ is set longer than the before mentioned period of time $T_2$. Since if the actual engine speed $N_{EA}$ is lower than the target engine speed lower limit Nu, the stepper motor 1110 causes the transmission to shift down to cause an increase in engine speed, whereas, if the actual engine speed is higher than the target engine speed upper limit value Nu, the stepper motor 1110 is activated in upshift direction to cause the transmission to shift up to cause a decrease in engine speed, the actual reduction ratio of the transmission is controlled such that the actual engine speed $N_{EA}$ is held within a predetermined range about the target engine speed, i.e., $N_L \leq N_{EA} \leq Nu$.

If an answer to the inquiry in step 707 is NO, step 709 is executed to determine whether the shift position is L range position. If the shift position is L range position, step 2740 is executed to retrieve L range shift pattern to determine a target engine speed and the control goes to step 2783. If the answer to the inquiry in step 709 is NO, the control goes to step 713.

It will now be understood from the preceding description that the target engine speed $N_{ED}$ as obtained in step 902 remains unchanged if the throttle valve is opened (a flow from step 904 to step 2783) or if the throttle valve is closed and the vehicle speed is zero (a flow from step 904 via step 906 to step 2783) or if the throttle valve is open and the vehicle speed is not zero and the vehicle is under acceleration (a flow along steps 904, 906 and 908 to step 2783), and thus the engine speed is controlled in accordance with the shift pattern as illustrated in FIG. 5. It will also be understood that if the control goes to step 910 and then step 912, i.e., if the vehicle is decelerating with the throttle valve fully closed and the road wheels are not locked, the target engine speed $N_{ED}$ is increased by the increment Nup which increases as the magnitude of deceleration increases as shown in FIG. 6. Therefore, the target engine speed is increased as the magnitude of deceleration increases, causing the transmission to shift down toward the largest reduction ratio quickly.

Figure 7:
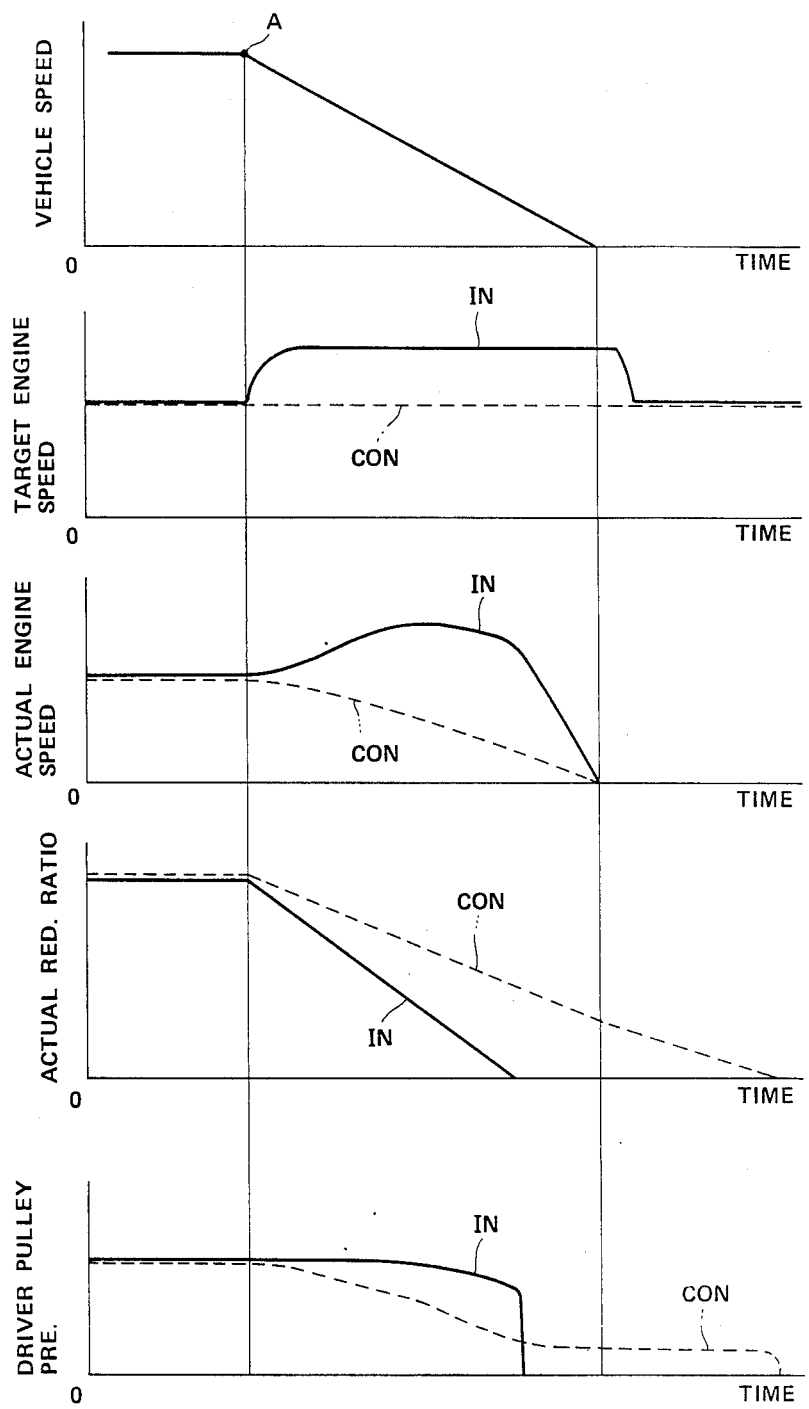
FIG. 7 shows in fully drawn lines variations of target engine speed, actual engine speed, actual reduction ratio, and driver pulley pressure during transistion after the vehicle has started decelerating.

FIG. 7 illustrates in fully drawn lines IN how the target engine speed, actual engine speed, actual reduction ratio and driver pulley pressure vary if the vehicle to which the above described control according to the present invention is applied is subject to quick brake and starts decelerating at an operation point A when the vehicle is crusing with small reduction ratio. For comparison purposes, are broken lines CON obtained with the vehicle which is not provided with the control according to the present invention are drawn in FIG. 7. As will be readily understood, since the target engine speed is increased by the increment Nup, the transmission is controlled to effect a quick downshift to cause the engine speed to increase toward the increased target engine speed. This causes the transmission to establish the largest reduction ratio before the vehicle comes to a halt. Thus, the V-belt always assume a tension state ready for torque transmission when the engine torque is reapplied to the transmission immediately before the vehicle comes to a halt or immediately thereafter. Hence, no slip of the V-belt takes place. Besides, effective engine brake running is accomplished during deceleration.

Although, in the described embodiment, the engine speed is used as a set value and a feedback value, a driver pulley speed or a reduction ratio may be used instead of the engine speed. In the use of the driver pulley speed, the target engine speed and actual engine speed which have been used are replaced with a target driver pulley speed and an actual driver pulley speed, respectively.

Figure 8:
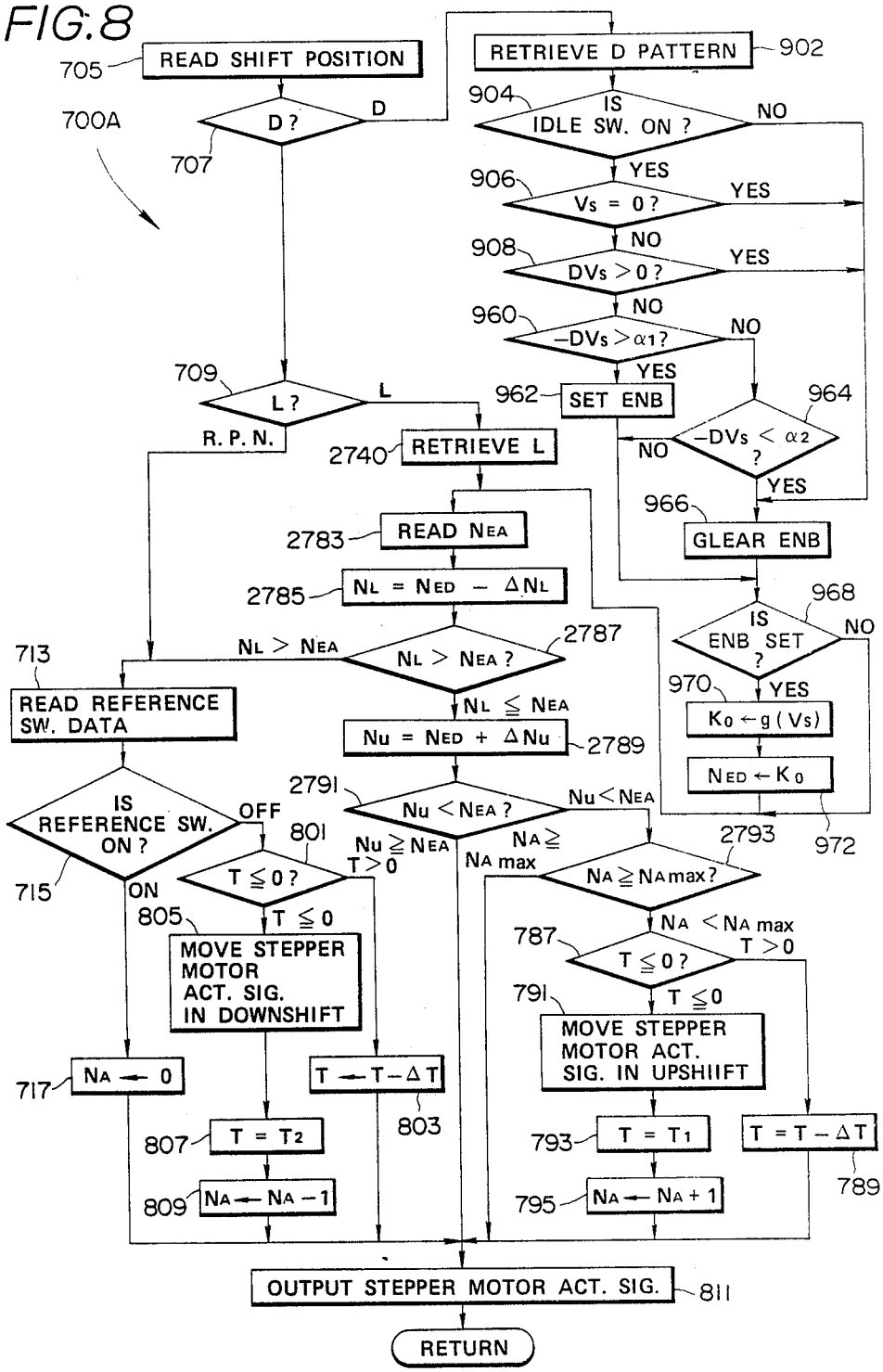
FIG. 8 is a flow chart of a control routine executed by a second embodiment of a reduction ratio control according to the present invention.

A second embodiment is described hereinafter referring to FIG. 8. FIG. 8 shows a flow chart of a stepper motor control routine 700A used in the second embodiment. The control routine 700A is substantially similar to the control routine 700 shown in FIG. 4 except that new steps 960, 962, 964, 966, 968, 970, and 972 have replaced steps 910 and 912 of the control routine 700. According to this second embodiment, if the magnitude of deceleration is greater than a predetermined value $\alpha_1$ (alpha one), a target engine speed $N_{ED}$ is set equal to a predetermined variable $K_0$ (steps 960 and 962). The predetermined variable $K_0$ indicates a target engine speed that is greater than the target engine speed obtained in retrieval step 902 and it is variable with vehicle speed Vs (step 970). If the magnitude of deceleration $-DVs$ is greater than the predetermined value $\alpha_1$, an engine brake flag ENB is set in step 962 and then step 968 is executed to determine whether the flag ENB is set in step 968. Then, step 970 and step 972 are executed to set the target engine speed $N_{ED}$ equal to $K_0$. The reason why the variable $K_0$ varies with the vehicle speed Vs is to provide a sufficiently quick reduction ratio change at high vehicle speeds and to provide a less quick reduction ratio change at low vehicle speeds so as to prevent excessive engine brake effect at low vehicle speeds. If the magnitude of deceleration $-DVs$ becomes less than another predetermined value $\alpha_2$ (less than $\alpha_1$, the target engine speed $N_{ED}$ obtained in step 902 remains unchanged and used in the control (steps 964 and 966).

From the preceding description, it will now be appreciated that during vehicle's running under deceleration the reduction ratio is caused to change quickly toward the largest reduction ratio in accordance with the magnitude of deceleration. As a result, the largest reduction ratio is established before the vehicle comes to a halt.

What is claimed is:

1. A reduction ratio control for a continuously variable transmission of a motor vehicle, the continuously variable transmission being connected to an engine of the motor vehicle to be driven thereby, the reduction ratio control comprising:

means for carrying out a reduction ratio change of the continuously variable transmission in such a manner as to decrease a difference between an actual value in a predetermined operating variable and a target value in said predetermined operating variable toward zero;

means for determining a deceleration which the motor vehicle is subject to;

means for changing said target value to a new target value in response to said deceleration after said deceleration which the motor vehicle is subjected to is determined; and the means for carrying out said reduction ratio change causes the actual value to approach the new target value quicker than it controlled the actual value to approach the target value.

2. A reduction ratio control as claimed in claim 1, wherein said predetermined operating variable is one of the engine speed, the driver pulley speed, and the reduction ratio.

3. A reduction ratio control as claimed in claim 1, wherein said new target value differs from said target value in such a manner as to cause said means for carrying out said reduction ratio change to increase reduction ratio in proportion to the magnitude of said deceleration.

4. A reduction ratio control as claimed in claim 1, wherein the difference between said new target value and said target value varies in proportion to the magnitude of said deceleration.

5. A reduction ratio control as claimed in claim 1, wherein said changing means adds a predetermined increment to said target value to give said new target value when the magnitude of said deceleration exceeds a predetermined deceleration value.

6. A reduction ratio control as claimed in claim 4, wherein said predetermined increment varies with the vehicle speed.

7. A method of controlling a reduction ratio for a continuously variable transmission of a motor vehicle, the continuously variable transmission being connected to an engine of the motor vehicle to be driven thereby, the method comprising the steps of:

carrying out a reduction ratio change of the continuously variable transmission in such a manner as to decrease a difference between an actual value in a predetermined operating variable and a target value in said predetermined operating variable toward zero;

determining a deceleration which the motor vehicle is subject to; and changing said target value to a new target value in response to said deceleration after said deceleration which the motor vehicle is subjected to is determined, the means for carrying out the reduction ratio change causes the actual value to approach the new target value quicker than it controlled the actual value to approach the target value.

8. A method of controlling a reduction ratio for a continuously variable transmission of a motor vehicle, the continuously variable transmission being connected to an engine of the motor vehicle to be driven thereby, the method comprising the steps of:

determining the magnitude of a deceleration which the motor vehicle is subjected to;

determining a first target value in a predetermined operating variable;

determining an increment as a function of said magnitude of deceleration which has been determined;

varying said first target value by said increment which has been determined to give a second target value;

carrying out a reduction ratio change of the continuously variable transmission in such a manner as to decrease a difference between an actual value in said predetermined operating variable and said second target value in said predetermined operating variable toward zero during a predetermined operating condition where an idle switch is ON, the vehicle speed is greater than zero and the motor vehicle is subjected to deceleration; and carrying out a reduction ratio change of the continuously variable transmission in such a manner as to decrease a difference between said actual value in said predetermined operating variable and said first target value in said predetermined operating variable toward zero when said predetermined operating condition fails to be satisfied.

9. A method of controlling a reduction ratio for a continuously variable transmission of a motor vehicle, the continuously variable transmission being connected to an engine of the motor vehicle to be driven thereby, the method comprising the steps of:

determining the magnitude of a deceleration which the motor vehicle is subjected to;

determining a first target value in a predetermined operating variable;

determining a second target value in said predetermined operating variable as a function of the vehicle speed;

carrying out a reduction ratio change of the continuously variable transmission in such a manner as to decrease a difference between an actual value in said predetermined operating variable and said second target value in said predetermined operating variable toward zero during a predetermined operating condition where an idle switch is ON, the vehicle speed is greater than zero and the motor vehicle is subject to deceleration; and carrying out a reduction ratio change of the continuously variable transmission in such a manner as to decrease a difference between said actual value in said predetermined operating variable and said first target value in said predetermined operating variable toward zero when said predetermined operating condition fails to be satisfied.

* * * * *